United States Patent
Craig et al.

(10) Patent No.: US 6,169,149 B1
(45) Date of Patent: Jan. 2, 2001

(54) EMULSION POLYMERIZED SILICONE-ACRYLATE RUBBER IMPACT MODIFIERS THERMOPLASTIC BLENDS, AND METHODS FOR MAKING

(75) Inventors: Daniel Horace Craig, Niskayuna; Rong Hu, Latham, both of NY (US)

(73) Assignee: General Electric Company, Schenectady, NY (US)

(*) Notice: Under 35 U.S.C. 154(b), the term of this patent shall be extended for 0 days.

(21) Appl. No.: 09/205,311

(22) Filed: Dec. 4, 1998

(51) Int. Cl.[7] .................... C08L 83/10; C08G 77/38; C08F 283/12
(52) U.S. Cl. ................ 525/474; 525/479; 524/837
(58) Field of Search .................... 525/474, 479; 524/837

(56) References Cited

U.S. PATENT DOCUMENTS 3,294,725 * 12/1966 Findlay et al. .
4,690,986    9/1987  Sasaki et al. .
4,994,522    2/1991  Sasaki et al. .
5,132,359    7/1992  Sasaki et al. .
5,629,388 *  5/1997  Himelrick et al. .................... 525/479
5,726,270    3/1998  Craig .

FOREIGN PATENT DOCUMENTS 0326038   2/1989  (EP) .

* cited by examiner

Primary Examiner—Robert Dawson
Assistant Examiner—Jeffrey B. Robertson
(74) Attorney, Agent, or Firm—Bernadette M. Bennett; Donald S. Ingraham

(57) ABSTRACT

Melt extrudable grafts of emulsion polymerized silicone rubber and polyacrylate rubber hybrids have been found to be valuable impact modifiers for organic thermoplastic polymeric materials. Optimum impact modifier properties are achieved by employing as a source material, an emulsion polymerized silicone rubber made under semi-continuous, low shear process conditions.

15 Claims, No Drawings

EMULSION POLYMERIZED SILICONE-ACRYLATE RUBBER IMPACT MODIFIERS THERMOPLASTIC BLENDS, AND METHODS FOR MAKING

BACKGROUND OF THE INVENTION

The present invention relates to an emulsion polymerization method for making silicone rubber and polyacrylate rubber hybrids having a volume average particle size in the range of about 400 nm to about 2 microns, which include monomodal and bimodal size distributions. More particularly, the present invention relates to grafts of such emulsion polymerized silicone rubber and polyacrylate rubber hybrids and to the use of such grafts as impact modifiers in thermoplastic resins. As used hereinafter, the expression "silicone rubber and polyacrylate rubber hybrid" means an interpenetrating composite of silicone rubber and polyacrylate rubber, where the silicone rubber and polyacrylate rubber are entangled in an inseparable fashion at the molecular level.

In Craig, U.S. Pat. No. 5,726,270, which is incorporated herein by reference, a process is shown for making monomodal dispersions of polysiloxanes having a volume average particle size in the range of about 50 nm to about 2 microns. The process of Craig is based on the use of low shear and substantially non-homogenizing polymerization conditions. It would be desirable therefor to be able to use this low shear procedure of Craig to make monomodal dispersions, of emulsion polymerized silicone rubber particles having a volume average particle size in the range of about 400 nm to about 2 microns. It also would be desirable to make multi-modal mixtures, such as bimodal mixtures of such aqueous silicone rubber particles, where at least one of the members of the mixture has a volume average particle size of at least 400 nm.

The semi-continuous emulsion polymerization conditions for making organopolysiloxane rubber having a predetermined volume average particle size of at least 400 nm, for example, can combine dropwise addition of polymerizable monomers, with mild agitation, such as stirring, as contrasted to the high shear homogenization conditions typically employed in polysiloxane emulsion production.

While acrylate rubbers are widely used for impact modification of thermoplastic materials where weathering is a concern, impact strength of acrylate rubber modified thermoplastic materials at low temperatures, such as 0° C., or below are substantially reduced, as compared to thermoplastic materials containing other organic blends, such as polybutadiene rubber.

Efforts to improve the performance of impact modifiers for use in thermoplastic polymer blends by combining the low temperature advantages of silicone rubber while maintaining good weatherability characteristics of acrylate rubber often fail. As shown, for example, in U.S. Pat. Nos. 4,994,522 and 5,132,359, emulsion polymerized silicone and polyacrylate rubber hybrids as impact modifiers in thermoplastic polymer blends, did not provide maximum impact strength, because of particle size limitations (less than 300nm) in the emulsion polymerized silicone rubber.

It would be desirable therefor to provide additional methods for making rubber impact modifiers for thermoplastic resins, which combined the low temperature advantages of silicone rubbers, with the weatherability benefits of acrylate rubbers.

BRIEF SUMMARY OF THE INVENTION

The present invention is based on the discovery that the polymerization techniques as shown by Craig, in U.S. Pat. No. 5,726,270 can be applied to improving the impact performance of thermoplastic compositions containing grafts of silicone rubber and polyacrylate rubber hybrids by achieving improved particle size control in making emulsion polymerized silicone rubber.

It has been found that emulsion polymerized silicone rubber and polyacrylate rubber hybrids produced with an aqueous dispersion of silicone rubber particles having a volume average size of between about 400nm to about 2 micron, are useful weatherable impact modifiers when grafted with an alkenyl monomer, to form a vinyl polymer shell, and incorporated into a thermoplastic resin.

In addition, an enhancement in impact properties in thermoplastic compositions also can be achieved with a mixture of grafts of emulsion polymerized silicone rubber and polyacrylate rubber hybrids, to produce a graft having multi-modal, such as bimodal particle size distribution. It is preferred, moreover, to use in making such grafts having multi-modal particle size distribution, at least one graft member of an emulsion polymerized silicone rubber and polyacrylate rubber hybrid which has a volume average particle size of at least 400 nm, and is present in the graft mixture in at least a major amount by weight.

The incorporation of grafts of silicone rubber and polyacrylate rubber hybrids into a thermoplastic polymer material has been found to enhance the impact strength of such materials. It has been found that the saturated nature of acrylate-derived rubber prevents embrittlement of the thermoplastic over time. Such impact modified materials are used in many applications requiring good weatherability and low temperature impact strength, including automotive, building, and construction applications, and in articles of manufacture such as garden furniture, boats, signs, outdoor enclosures for electrical or telecommunications interface devices such as smart network interface devices (SNID), and the like.

There is provided by the present invention, a method for making an impact modifier for enhancing the weather resistance and low temperature impact strength of organic thermoplastic polymers, which method comprises, (1) effecting the polymerization of silicone rubber monomers under semi-continuous emulsion polymerization conditions at a temperature of about 30° C. to about 110° C., to provide for the formation of a silicone rubber latex having a volume average particle size in the range of from about 400 nm to about 2 microns, (2) adding batchwise to the resulting silicone rubber latex of (1), while providing agitation at a pH of about 4 to about 9.5, and a temperature of about 20° C. to about 90° C., a mixture comprising polymerizable acrylate rubber monomers to provide a latex comprising an emulsion polymerized silicone rubber-polyacrylate rubber hybrid having a weight proportion of from about 95 parts to about 5 parts of silicone rubber, and from about 5 parts to about 95 parts of polyacrylate rubber, and where the addition of the polymerizable acrylate rubber monomers into the silicone rubber latex occurs before, or concurrently with sufficient polymerization catalyst to effect acrylate rubber formation, (3) grafting the emulsion polymerized silicone rubber-acrylate rubber hybrid latex of (2), with a sufficient amount of polymerizable alkenyl monomer to form a graft of the emulsion polymerized silicone rubber-polyacrylate rubber hybrid latex, and, (4) coagulating, washing and drying the grafted emulsion polymerized latex of (3).

A further aspect of the present invention is directed to impact modifiers comprising melt extrudable polymerized alkenyl monomer grafts of an emulsion polymerized silicone rubber-polyacrylate rubber hybrid arising from the initial use of an emulsion polymerized silicone rubber latex having a volume average particle size in the range of from about 400 nm to about 2 micron.

An additional aspect of the present invention is directed to a moldable thermoplastic organic polymeric material having improved low temperature weather resistance and impact strength comprising an organic thermoplastic polymeric material, and an effective amount of a silicone-acrylate impact modifier comprising the polymerized alkenyl monomer graft of an emulsion polymerized silicone rubber-polyacrylate rubber hybrid arising from the initial use of an emulsion polymerized silicone rubber latex having a volume average particle size in the range of from about 400 nm to about 2 micron.

Still another aspect of the present invention is directed to a method for preparing a moldable thermoplastic organic polymeric material having improved weather resistance and low temperature impact strength, which comprises mixing an organic thermoplastic polymeric material and an effective amount of a silicone-acrylate impact modifier, comprising the polymerized alkenyl material graft of an emulsion polymerized silicone rubber-polyacrylate rubber hybrid arising from the initial use of an emulsion polymerized silicone rubber latex having a volume average particle size in the range of from about 400 nm to about 2 micron.

DETAILED DESCRIPTION OF THE INVENTION

In the practice of one form of the method of the invention, an emulsion polymerized silicone rubber latex is initially formed by semi-continuously adding to a reactor containing water, which is being agitated, such as stirring, at a temperature in the range of about 30° C. to about 110° C., and preferably about 75° C. to about 95° C., a mixture of silicone rubber monomers. The semi-continuous addition of monomers can be effected, stepwise, and in a dropwise manner, over a period of up to 24 hours.

An effective amount of a surfactant can be used initially in the reactor as part of the agitated aqueous mixture, or it can be introduced with the silicone rubber monomers. Among the surfactants which can be used, dodecylbenzenesulfonic acid is preferred. However, additional surfactants which can be used if desired as shown by Craig, U.S. Pat. No. 5,726,270 which is incorporated herein by reference.

Various silicone rubber monomers can be used to form the initial emulsion polymerized silicone rubber latex used in the practice of the invention. Some of the preferred silicone rubber monomers include cyclosiloxanes, such as octamethylcyclotetrasiloxane, as shown for example in the Encyclopedia of Polymer Science and Engineering, volume 15, 2nd Edition, pp. 205–308 (1989), John Wiley and Sons. Cross-linking silanes include trifunctional silanes, such as trimethoxymethylsilane, and triethoxyphenylsilane; and tetrafunctional silanes, for example, tetraethoxysilane, and in further combination with alkenylacryloxydialkoxysilanes. The cross-linking silanes can be used at from about 0.1% to about 30% by weight of the silicone rubber monomer mixture.

The emulsion polymerized silicone rubber-polyacrylate rubber latex hybrid can be made by introducing a mixture of the polymerizable acrylate rubber monomers into a reactor containing the silicone rubber latex under a nitrogen stream. Prior to the addition of the polymerizable acrylate rubber monomers, the silicone rubber latex is preferably neutralized to a pH of about 6 to about 9, with a basic solution, such as sodium hydroxide, agitated and heated to a temperature of about 20° C. to about 90° C., followed by the addition of an effective amount of an acrylate rubber monomer polymerization catalyst such as an alkali persulfate.

Among the polymerizable acrylate rubber monomers which can be employed in combination with the silicone rubber latex to form the emulsion polymerized silicone rubber-acrylate rubber latex hybrid, there are included $C_{(1-12)}$ alkylacrylates, such as methyl acrylate, ethyl acrylate, n-propyl acrylate, n-butyl acrylate, and cross-linking acrylates, such as allyl methacrylate. Preferably, $C_{(4-9)}$ acrylates can be used.

In preparing the graft of the emulsion polymerized silicone rubber-acrylate rubber latex, or "rubber latex", a suitable alkenyl monomer, such as a vinyl monomer, or mixture, such as styrene, acrylonitrile, or mixture thereof can be used in combination with the rubber latex. If desired, alkyl methacrylates, such as methyl methacrylate can be used.

The proportion of alkenyl monomer and emulsion polymerized rubber latex can vary widely by weight. For example, there can be used by weight, from about 0.15 part to about 3.0 part of alkenyl monomer, per part of rubber to form the graft latex.

In order that those skilled in the art will be better able to practice the present invention, the following examples are given by way of illustration, and not by way of limitation. All parts are by weight unless indicated otherwise.

Weight percent solids of latex samples are determined after drying to a constant weight using a CEM Labwave 9000 gravimetric microwave drier. Particle size distributions are obtained using a Nicomp 370 Submicron Particle Sizer instrument applying a Gaussian analysis protocol.

EXAMPLE 1

A mixture of 7.6 parts of octamethylcyclotetrasiloxane, 0.16 part of tetraethoxysilane, and 0.24 part of γ-methacryloxypropyldimethoxymethylsilane is added to a stirring mixture in a reactor consisting of 43.2 parts of distilled water containing 0.044 part of dodecylbenzenesulfonic acid. The resulting mixture is agitated and maintained at 90° C. for 2.5 hours.

A pre-emulsion of siloxane precursors is then added dropwise to the above mixture over a 3.5 hour period. The pre-emulsion is prepared by mildly stirring a mixture consisting of 30.4 parts of octamethylcyclotetrasiloxane, 0.64 part of tetraethoxysilane, 0.96 part of γ-methacryloxypropyldimethoxymethylsilane, 0.32 part of dodecylbenzenesulfonic acid, and 16.4 parts distilled water. The resulting reaction mixture is stirred for an additional 2 hours at 90° C., then allowed to cool to room temperature. The reaction conversion is found to be 88.9%, and the volume average particle size of the emulsion polymerized silicone rubber latex is 400 nm.

There is mixed 18.9 parts of distilled water with 68.4 parts of the above silicone rubber latex neutralized to a pH 7–8 with 2% sodium hydroxide solution. The mixture is transferred to a reactor and the contents stirred and heated to 75° C. under a nitrogen atmosphere.

A solution of 2.9 parts of distilled water containing 0.024 part of sodium persulfate, and 0.024 part of sodium bicarbonate is added to the reactor containing the above mixture, followed by the batch addition of a mixture of 9.6 parts of butyl acrylate and 0.20 part of allyl methacrylate. The reaction mixture is maintained for 4 hours at 75° C., then is allowed to cool to room temperature. There is obtained a silicone rubber-polyacrylate rubber hybrid latex having 32.1% solids and a volume average particle size of 440 nm.

A graft of the above silicone rubber-polyacrylate rubber hybrid latex is made by the following procedure:

A mixture of 1.4 part of styrene and 0.47 part of acrylonitrile is added to a reactor containing an agitated mixture of 58.1 parts of the above silicone rubber-polyacrylate rubber hybrid latex and 9.9 parts of distilled water at a temperature of 75° C. Then 20% of a mixture of 0.047 part of sodium persulfate, 0.047 part of sodium bicarbonate, and 1.6 part of distilled water is added.

The resulting reaction mixture is heated for an additional 30 minutes at 75° C. There is then added dropwise over a 5 hour period, a pre-emulsion of 12.6 parts of styrene, 4.2 parts of acrylonitrile, 0.084 part of sodium dodecylbenzenesulfonate, and 11.5 parts of distilled water. Concurrently, during the 5 hour dropwise addition period, there is charged at the end the 1, 2, 3, and 4 hour feeding, equal increments of the remaining portion of the solution of 0.047 part of sodium persulfate, and 0.047 part of sodium bicarbonate, in 1.6 part of distilled water.

The reaction is maintained for 2 hours at 75° C. after the pre-emulsion addition, then cooled to room temperature. There is obtained a graft copolymer latex having 37.5% by weight solids.

EXAMPLE 2

There is made a bimodal graft copolymer mixture by blending 49.5 parts of a graft of a silicone rubber-polyacrylate rubber hybrid latex having a volume average particle size of 290 nm, and 50.5 parts of a graft of a silicone rubber-polyacrylate rubber hybrid latex having a volume average particle size of 720 nm.

The silicone rubber-polyacrylate rubber hybrid latex having a volume average particle size of 290 nm is prepared from a silicone rubber latex having a volume average particle size of 270 nm, which is shown as follows:

A mixture of 7.7 parts of octamethylcyclotetrasiloxane, 0.16 part of tetraethoxysilane, and 0.16 part of γ-methacryloxypropyldimethoxymethylsilane is added to a stirring mixture in a reactor consisting of 39.2 parts of distilled water containing 0.040 part of dodecylbenzenesulfonic acid and 0.040 part of sodium dodecylbenzenesulfonate. The resulting mixture is agitated and maintained at 89° C. for 3 hours.

A pre-emulsion of siloxane precursors is then added dropwise to the above mixture over a 3 hour period. The pre-emulsion is prepared by mildly stirring a mixture consisting of 30.7 parts of octamethylcyclotetrasiloxane, 0.64 part of tetraethoxysilane, 0.64 part of γ-methacryloxypropyldimethoxymethylsilane, 0.16 part of dodecylbenzenesulfonic acid, 0.16 part of sodium dodecylbenzenesulfonate, and 15.4 parts distilled water. The resulting reaction mixture is stirred for an additional 2.5 hours at 89° C., then allowed to cool to room temperature. The reaction conversion is found to be 88.1%, and the volume average particle size of the emulsion polymerized silicone rubber latex is 270 nm.

There is mixed 11.1 parts of distilled water with 73.3 parts of the above silicone rubber latex neutralized to a pH 7–8 with 2% sodium hydroxide solution. The mixture is transferred to a reactor and the contents stirred and heated to 80° C. under a nitrogen atmosphere. A solution is added of 5.6 parts of distilled water containing 0.025 part of sodium persulfate and 0.025 part of sodium bicarbonate, followed by a batch addition of a mixture 9.8 parts of butyl acrylate and 0.20 part of allyl methacrylate. The polymerization is conducted for 3 hours at 80° C., then cooled to room temperature. There is obtained a silicone rubber-polyacrylate rubber hybrid latex having a total solids concentration of 33.3% and a volume average particle size of 290 nm.

A graft of the above silicone rubber-polyacrylate rubber hybrid latex is prepared as follows:

A mixture of 1.4 part of styrene, and 0.48 part of acrylonitrile, is added to a reactor containing a mixture at 75° C. of 57.7 parts of the above silicone rubber-polyacrylate rubber hybrid latex, and 6.7 parts of distilled water. There is then added to the mixture 25% of a mixture of 0.048 part of sodium persulfate, 0.048 part of sodium bicarbonate, and 5.0 parts of distilled water, and the reactor contents maintained for 0.5 hour at 75° C. There is then added dropwise to the mixture over a three hour period, a pre-emulsion of 13.0 parts of styrene, 4.3 parts acrylonitrile, 0.086 part of sodium dodecylbenzenesulfonate, and 7.1 parts of distilled water. Equal quarterly increments of the earlier sodium persulfate solution are added concurrently at the end of the first, second and third hours of the pre-emulsion feed. There is then added 4.1 parts of distilled water and the reaction is maintained for two additional hours at 75° C. There is obtained a latex having 38.4% solids, of a graft of a silicone rubber-polyacrylate rubber hybrid having a volume average particle size of 290 nm.

The graft of a silicone rubber-polyacrylate rubber hybrid having a volume average particle size of 720 nm is based on the initial preparation of a silicone rubber latex with a mean particle size of 660 nm, which is shown as follows:

A pre-emulsified mixture of 300 parts of water, 9.6 parts of dodecylbenzenesulfonic acid, and 930 parts of octamethylcyclotetrasiloxane, is added over 330 minutes to a stirring mixture at 86° C. in a reactor containing 450 parts of distilled water. The reaction mixture is heated for an additional 6 hours after the addition and then allowed to cool to room temperature.

A batchwise addition to the mixture is made consisting of 18.6 part of γ-methacryloxypropyldimethoxymethylsilane, and 18.6 part of tetraethoxysilane. The mixture is reheated to 86° C., maintained at that temperature for 5 hours, and then allowed to cool to ambient temperature. There is obtained a silicone rubber latex having a volume average particle size of rubber 660 nm.

A sample of 56.5 parts of the above silicone rubber latex which is neutralized to a pH 7–8 with 2% sodium hydroxide solution is mixed with 26.5 parts of distilled water and transferred to a reactor. The reactor contents are stirred under a nitrogen atmosphere and heated to 75° C. A solution is added of 5.0 parts of distilled water containing 0.03 part of sodium persulfate and 0.03 part of sodium bicarbonate, followed by a batch addition of a mixture 11.8 parts of butyl acrylate and 0.24 part of allyl methacrylate. The polymerization is conducted for 4 hours at 75° C., then cooled to room temperature. There is obtained a silicone rubber-polyacrylate rubber hybrid latex having a total solids concentration of 39.7% and a volume average particle size of 720 nm.

A silicone-acrylate hybrid based graft-copolymer is made

A mixture of 1.4 part of styrene, and 0.47 part of acrylonitrile, is added to a reactor containing an agitated mixture at 75° C. of 47.7 parts of the above silicone rubber-polyacrylate rubber hybrid latex, and 28 parts of distilled water. There is then added to the mixture, one fifth of a "persulfate mixture" of 0.047 part of sodium persulfate, 0.047 part of sodium bicarbonate, and 3.3 parts of distilled water and the reactor contents is maintained for 0.5 hour at 75° C.

Upon completion of the heating period, there is added dropwise to the mixture over a four-hour period, a pre-emulsion of 12.7 parts of styrene, 4.2 parts acrylonitrile. Concurrently, equal increments (one fifth) of the above persulfate mixture is added at the end of hours 1, 2, 3, and 4 of the pre-emulsion feed. There is then added, 0.057 part of sodium dodecylbenzenesulfonate, and 2.1 parts of distilled water. The reaction is maintained for two additional hours at 75° C., beyond the completion of the pre-emulsion addition. There is obtained a latex having 37.6% solids, of a graft of a silicone rubber-polyacrylate rubber hybrid having a volume average particle size of 720 nm.

A bimodal latex mixture is prepared by blending 49.5 parts of the latex of the graft of a silicone rubber-polyacrylate rubber hybrid having a volume average particle size of 290 nm. and 50.5 parts of the latex of the graft of a silicone rubber-polyacrylate rubber hybrid having a volume average particle size of 720 nm.

EXAMPLE 3

Several additional styrene-acrylonitrile graft copolymers of silicone rubber-polyacrylate rubber are prepared in accordance with the method of the present invention having particle sizes in the range of 310 nm to 660 nm, and silicone rubber-polyacrylate rubber hybrids having a volume average particle size in the range of about 330 nm to 700 nm. The respective impact modifiers are based on the initial preparation and use of silicone rubber latexes having particle sizes in the range of 310 nm to 660 nm, and silicone rubber-polyacrylate rubber hybrids having a volume average particle size in the range of about 330 nm to 700 nm.

Graft silicone rubber-polyacrylate rubber latexes are coagulated in a 1.5% aqueous calcium chloride solution maintained at 85° C. by slowly adding one part of the latex to one part of the aqueous calcium chloride solution. The resulting polymer solids are filtered, washed with distilled water at ambient temperatures, and dried in a vacuum oven at room temperature for 24 hours, to form a fine powder. This powder is suitable as an impact modifier for a thermoplastic polymer.

For comparison, a commercially available styrene-acrylonitrile graft copolymer of a silicone rubber-polyacrylate rubber hybrid having a volume average particle size in the range of about 280 nm was also evaluated. This material was Metablen S-2001, which is made by Mitsubishi Rayon Co. Ltd. The Metablen S-2001 silicone rubber impact modifier can be prepared in accordance with the method of Sasaki et al, U.S. Pat. No. 5,132,359.

A series of dry blends are prepared by respectively mixing 46 parts of SAN (a 75:25 by weight copolymer of styrene and acrylonitrile), 54 parts of a particular graft copolymer of example 1-3, and 1 part of Irganox 1076, a stabilizer of Ciba Geigy Corporation. The dry blends are extruded using a Welding Engineers 20 mm twin-screw extruder at 450° F. set temperature, 400 rpm, and 15–17 lbs/hour throughput, to obtain pellets. The pellets are injection molded to produce 0.125 in. width test specimens utilizing an Engel 30 ton injection molder with a 450° F. barrel set temperature and 145° F. mold temperature.

The following Table, shows the Izod impact results derived from the respective thermoplastic SAN/silicone rubber-polyacrylate rubber graft blends. These Izod impact results are the average value obtained at room temperature from five test samples. A Testing Machine Inc. Monitor/impact instrument model 43-02 is used which has a 2 lb pendulum capacity. Commercially available Metablen S-2001, available from Mitsubishi, is shown as a comparative example.

| Impact Values of SAN Thermoplastic Blends | | |
|---|---|---|
| Graft Copolymer SAN (parts by weight) | Silicone Acrylate Latex Particle Size (nm) | RT Izod Impact (ft-lb/in) |
| [Metablen S-2001 blended to achieve 27% total rubber] | 280 | 1.4 |
| | 330 | 2.7 |
| 54/46 | 360 | 3.7 |
| 54/46 | 360 | 4.4 |
| 54/46 | 440 | 4.9 |
| 54/46 | 700 | 3.7 |
| 54/46 | 290/720 | 5.4 |

The above results show that the blending of an effective amount of the silicone rubber-polyacrylate rubber graft hybrids, or impact modifiers of the present invention, with a commercially available thermoplastic organic polymer, such as SAN, can provide thermoplastic compositions having improved impact strength as compared to the impact modifiers of the prior art.

The above results also show that valuable impact modifiers for thermoplastic polymers can be made by polymerizing acrylate rubber forming monomers in the presence of a silicone rubber latex having a volume average particle size of about 400 nm to 2 microns to form a silicone rubber-polyacrylate rubber hybrid latex, and the grafting of such latex with polymerizable alkenyl monomers, such as a styrene and acrylonitrile mixture.

Further, impact modifiers of the present invention also can be made from multi-modal, such as bimodal blends of substantially monomodal latex grafts of silicone rubber-polyacrylate rubber, where at least one of the substantially monomodal latex grafts of silicone rubber-polyacrylate rubber is made from a silicone rubber latex having a volume average particle size of at least 400 nm to 2 microns, and is preferably present in at least a major amount by weight.

The impact modifiers of the present invention also can be used to impart improved impact strength and weatherability to other moldable thermoplastic organic polymer materials including those comprising at least one polyester, polycarbonate, polyestercarbonate, polyamide, polyimide, polyetherimide, polyphenylene ether, polystyrene, or a copolymer of styrene with acrylonitrile, methacrylonitrile, esters of acrylic acid, methacrylic acid or copolymers thereof.

What is claimed is:

1. A method for making an impact modifier for enhancing the weather resistance and low temperature impact strength of organic thermoplastic polymers, which method comprises, (1) effecting the polymerization of silicone rubber monomers under semi-continuous emulsion polymerization conditions at a temperature of about 30° C. to about 110° C., to provide for the formation of a silicone rubber latex having a volume average particle size in the range of from about 400 nm to about 2 microns, (2) adding batchwise to the resulting silicone rubber latex of (1), while providing agitation at a pH of about 4 to about 9.5, and a temperature of about 20° C. to about 90° C., a mixture comprising polymerizable acrylate rubber monomers to provide a latex comprising an emulsion polymerized silicone rubber-acrylate rubber hybrid having a weight proportion of from about 95 parts to about 5 parts of silicone rubber, and from about 5 parts to about 95 parts of polyacrylate rubber, and where the addition of the polymerizable acrylate rubber monomers into the silicone rubber latex occurs before, or concurrently with sufficient polymerization catalyst to effect acrylate rubber formation, (3) grafting the emulsion polymerized silicone rubber-acrylate rubber hybrid latex of (2), with a sufficient amount of a polymerizable alkenyl containing organic material to form a graft of the emulsion polymerized silicone rubber-acrylate rubber hybrid latex, and, (4) coagulating, washing and drying the grafted emulsion polymerized latex of (3).

2. A method in accordance with claim 1, where the silicone rubber monomers comprise octamethylcyclotetrasiloxane, tetraethoxysilane, and gamma-methacryloxypropyidimethoxymethylsilane.

3. A method in accordance with claim 1, where the polymerizable acrylate rubber monomers are butyl acrylate and allyl methacrylate.

4. A method in accordance with claim 1, where the polymerizable alkenyl containing organic material used in forming the graft is a mixture of styrene and acrylonitrile.

5. An impact modifier for enhancing the weather resistance and low temperature impact strength for thermoplastic polymers, wherein the impact modifier comprises a melt extrudable polymerized alkenyl monomer graft of an emulsion polymerized silicone rubber-polyacrylate rubber hybrid wherein the hybrid is produced with polymerizable acrylate rubber monomers and an emulsion polymerized silicone rubber latex having a volume average particle size in the range from about 400 nm to about 2 microns wherein the impact modifier is made by a method which comprises:

(1) effecting the polymerization of silicone rubber monomers under semi-continuous emulsion polymerization conditions at a temperature in a range between about 30° C. and about 100° C., to provide for the formation of the silicone rubber latex, (2) adding batchwise to the resulting silicone rubber latex of (1), while providing agitation at a pH in a range between about 4 and about 9.5, and a temperature in a range between about 20° C. and about 90° C., a mixture comprising polymerizable acrylate rubber monomers to provide a latex comprising an emulsion polymerized silicone rubber-acrylate rubber hybrid having a weight proportion in a range between about 95 parts and about 5 parts of silicone rubber, and in a range between about 5 parts and about 95 parts of polyacrylate rubber, and where the addition of the polymerizable acrylate rubber monomers into the silicone rubber latex occurs before, or concurrently with sufficient polymerization catalyst to effect acrylate rubber formation, (3) grafting the emulsion polymerized silicone rubber-acrylate rubber hybrid latex of (2), with a sufficient amount of a polymerizable alkenyl containing organic material to form a graft of the emulsion polymerized silicone rubber-acrylate rubber hybrid latex, and, (4) coagulating, washing, and drying the grafted emulsion polymerized latex of (3).

6. An impact modifier in accordance with claim 5, which is a mixture of melt extrudable polymerized alkenyl monomer grafts of emulsion polymerized silicone rubber-polyacrylate rubber hybrids, where at least one of the melt extrudable polymerized alkenyl monomer grafts is a graft of an emulsion polymerized silicone rubber-polyacrylate rubber hybrid produced with a silicone rubber latex having a volume average particle size within the range of from about 400 nm to about 2 microns.

7. A moldable thermoplastic organic polymeric material having improved weather resistance and low temperature impact strength comprising an organic thermoplastic material and an effective amount of a silicone-acrylate impact modifier wherein the organic thermoplastic material comprises a styrene and acrylonitrile copolymer and a polymerized alkenyl material graft wherein the graft comprises a melt extrudable sytrene and acrylonitrile graft of an emulsion polymerized silicone rubber-polyacrylate rubber hybrid wherein the hybrid is produced with polymerizable acrylate rubber monomers and an emulsion polymerized silicone rubber latex having a volume average particle size in the range from about 400 nm to about 2 microns wherein the latex is made under semi-continuous reaction conditions.

8. A moldable thermoplastic organic polymeric material in accordance with claim 7, where the silicone-acrylate impact modifier is produced with a mixture of polymerized alkenyl monomer grafts of emulsion polymerized silicone rubber-polyacrylate rubber hybrids, where at least one of the emulsion polymerized silicone rubber-polyacrylate rubber hybrids is produced with an emulsion polymerized silicone rubber latex having a volume average particle size in the range of from about 400 nm to about 2 micron.

9. A moldable thermoplastic organic polymeric material in accordance with claim 8, where the silicone-acrylate impact modifier is produced with a bimodal mixture of polymerized alkenyl monomer grafts of emulsion polymerized silicone rubber-polyacrylate rubber hybrids.

10. A moldable thermoplastic organic polymeric material in accordance with claim 8, where the polymerized alkenyl monomer graft arising from a silicone rubber-polyacrylate rubber hybrid having a volume average particle size in the range of from about 400 nm to about 2 micron is present in the mixture of polymerized alkenyl monomer grafts in at least a major proportion by weight.

11. An article of manufacture made from the moldable thermoplastic organic polymeric material of claim 7.

12. An article according to claim 11 comprising an outdoor enclosure for an electrical or telecommunications interface device.

13. A method for preparing a moldable thermoplastic organic polymeric material having improve weather resistance and low temperature impact strength, wherein the method comprises mixing an organic thermoplastic polymeric material and an effective amount of a silicone-acrylate impact modifier, wherein the impact modifier comprises a polymerized alkenyl material graft of an emulsion polymerized silicone rubber-polyacrylate rubber hybrid wherein the hybrid is produced with polymerizable acrylate rubber monomers and an emulsion polymerized silicone rubber latex having a volume average particle size in the range from about 400 nm to about 2 microns wherein the impact modifier is made by a method which comprises:

(1) effecting the polymerization of silicone rubber monomers under semi-continuous emulsion polymerization conditions at a temperature in a range between about 30° C. and about 100° C., to provide for the formation of the silicone rubber latex, (2) adding batchwise to the resulting silicone rubber latex of (1), while providing agitation at a pH in a range between about 4 and about 9.5, and a temperature in a range between about 20° C. and about 90° C., a mixture comprising polymerizable acrylate rubber monomers to provide a latex comprising an emulsion polymerized silicone rubber-acrylate rubber hybrid having a weight proportion in a range between about 95 parts and about 5 parts of silicone rubber, and in a range between about 5 parts and about 95 parts of polyacrylate rubber, and where the addition of the polymerizable acrylate rubber monomers into the silicone rubber latex occurs before, or concurrently with sufficient polymerization catalyst to effect acrylate rubber formation, (3) grafting the emulsion polymerized silicone rubber-acrylate rubber hybrid latex of (2), with a sufficient amount of a polymerizable alkenyl containing organic material to form a graft of the emulsion polymerized silicone rubber-acrylate rubber hybrid latex, and, (4) coagulating, washing, and drying the grafted emulsion polymerized latex of (3).

14. The method of claim 13, wherein the organic thermoplastic polymeric material is at least one polyester, polycarbonate, polyestercarbonate, polyamide, polyetherimide, polyphenylene ether, polystyrene, or a copolymer of styrene with acrylonitrile, methacrylonitrile, esters of acrylic acid, methacrylic acid or copolymers thereof.

15. A method for making an impact modifier for enhancing the weather resistance and low temperature impact strength of organic thermoplastic polymers, which method comprises, (1) effecting the polymerization of silicone rubber monomers wherein the silicone rubber monomers comprise octamethylcyclotetrasiloxane, tetraethoxysilane, and gamma-methacryloxypropyldimethoxymethylsilane under semi-continuous emulsion polymerization conditions at a temperature of about 30° C. to about 110° C., to provide for the formation of a silicone rubber latex having a volume average particle size in the range of from about 400 nm to about 2 microns, (2) adding batchwise to the resulting silicone rubber latex of step (1), while providing agitation at a pH of about 4 to about 9.5, and a temperature of about 20° C. to about 90° C., a mixture comprising butyl acrylate and allyl methacrylate to provide a latex comprising an emulsion polymerized silicone rubber-acrylate rubber hybrid having a weight proportion of from about 95 parts to about 5 parts of silicone rubber, and where the addition of the butyl acrylate and allyl methacrylate into the silicone rubber latex occurs before, or concurrently with sufficient polymerization catalyst to effect acrylate rubber formation, (3) grafting the emulsion polymerized silicone rubber-acrylate rubber hybrid latex of step (2), with a sufficient amount of a mixture of sytrene and acrylonitrile to form a graft of the emulsion polymerized silicone rubber-acrylate rubber hybrid latex, and, (4) coagulating, washing and drying the grafted emulsion polymerized latex of step (3).

* * * * *